United States Patent
Kesarwani et al.

(10) Patent No.: US 10,601,580 B2
(45) Date of Patent: Mar. 24, 2020

(54) SECURE ORDER PRESERVING STRING COMPRESSION

(71) Applicant: International Business Machines Corporation, Armonk, NY (US)

(72) Inventors: Manish Kesarwani, Bangalore (IN); Akshar Kaul, Bangalore (IN); Sameep Mehta, New Delhi (IN); Hong Min, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 123 days.

(21) Appl. No.: 15/817,972

(22) Filed: Nov. 20, 2017

(65) Prior Publication Data

US 2019/0158269 A1    May 23, 2019

(51) Int. Cl.
| | | |
|---|---|---|
| *G06F 21/00* | (2013.01) | |
| *H04L 29/06* | (2006.01) | |
| *H04L 9/06* | (2006.01) | |
| *H04L 9/08* | (2006.01) | |
| *G06F 12/14* | (2006.01) | |
| *G06F 16/27* | (2019.01) | |
| *G06F 16/2455* | (2019.01) | |

(52) U.S. Cl.
CPC ............ *H04L 9/06* (2013.01); *G06F 12/1408* (2013.01); *G06F 16/24558* (2019.01); *G06F 16/27* (2019.01); *H04L 9/0869* (2013.01); *H04L 9/0894* (2013.01); *G06F 2212/1052* (2013.01); *H04L 2209/30* (2013.01)

(58) Field of Classification Search
CPC ... H04L 9/06; H04L 9/0869; G06F 16/24558; G06F 16/27; G06F 12/1408; G06F 2212/1052
See application file for complete search history.

(56) References Cited

U.S. PATENT DOCUMENTS

| | | |
|---|---|---|
| 5,610,603 A | 3/1997 | Plambeck |
| 7,868,789 B1 | 1/2011 | Binnig et al. |
| 8,739,265 B2 * | 5/2014 | Ang .................... H04L 61/2596 726/9 |

(Continued)

FOREIGN PATENT DOCUMENTS

EP      2270684 B1    3/2016

OTHER PUBLICATIONS

Agrawal et al., "Order Preserving Encryption for Numeric Data," SIGMOD '04: Proceedings of the 2004 ACM SIGMOD international conference on Management of data, Jun. 2004, 12 pgs.

(Continued)

*Primary Examiner* — Lisa C Lewis
(74) *Attorney, Agent, or Firm* — Jared L. Montanaro

(57) ABSTRACT

A processor may receive plaintext data. The plaintext data may correspond to a query. The processor may identify a granularity of the plaintext data. The processor may compress the plaintext data using a binary search tree. The binary search tree may compress the plaintext data based on the granularity of the plaintext data. The processor may encrypt the plaintext data by randomizing the order in which the binary search tree stores the compression of the plaintext data. The stored order of the binary search tree may act as a private key. The processor may process the query over an encrypted cumulative compressed database.

20 Claims, 6 Drawing Sheets

(56) References Cited

U.S. PATENT DOCUMENTS

| | | | |
|---|---|---|---|
| 9,037,860 B1* | 5/2015 | Kerschbaum | H04L 63/0428 713/168 |
| 9,455,831 B1 | 9/2016 | Grubbs | |
| 9,503,434 B2 | 11/2016 | Paris et al. | |
| 9,544,134 B2 | 1/2017 | Aissi et al. | |
| 9,584,315 B2 | 2/2017 | Teranishi | |
| 10,027,486 B2 | 7/2018 | Liu | |
| 10,255,454 B2 | 4/2019 | Kamara et al. | |
| 2010/0328115 A1* | 12/2010 | Binnig | G06F 16/24561 341/51 |
| 2015/0178305 A1 | 6/2015 | Mueller et al. | |
| 2015/0278544 A1 | 10/2015 | Movshovitz | |
| 2017/0300713 A1* | 10/2017 | Fan | H04L 9/0618 |

OTHER PUBLICATIONS

Boldyreva et al., "Order-preserving symmetric encryption," Advances in Cryptology—EUROCRYPT 2009, 28th Annual International Cryptology Conference, A. Joux ed., LNCS, pp. 1-28, Springer, 2009.

Boldyreva et al. "Order-Preserving Encryption Revisited: Improved Security Analysis and Alternative Solutions," In Advances in Cryptology—CRYPTO 2011, pp. 1-36, Springer, 2011.

Iyer et al., "Data Compression Support in Databases," Proceedings of the 20th VLDB Conference, pp. 695-704, Sep. 1994.

Kerschbaum et al., "Optimal Average-Complexity Ideal-Security Order-Preserving Encryption," http://dl.acm.org/citation.cfm?id=2660277, CCS '14 Proceedings of the 2014 ACM SIGSAC Conference on Computer and Communications Security, pp. 275-286, Nov. 3-7, 2014.

Mell et al., "The NIST Definition of Cloud Computing," Recommendations of the National Institute of Standards and Technology, U.S. Department of Commerce, Special Publication 800-145, Sep. 2011, 7 pgs.

Popa et al., "An ideal-security protocol for order-preserving encoding," In Security and Privacy (SP), 2013 IEEE Symposium on, pp. 463-477. IEEE, 2013.

Raman et al. "DB2 with BLU Acceleration: So Much More than Just a Column Store," Proceedings of the VLDB Endowment 6.11 (2013): 1080-1091.

Zandi et al., "Sort Order Preserving Data Compression for Extended Alphabets," Data Compression Conference, 1993. DCC '93. IEEE, pp. 330-339, 1993.

* cited by examiner

SECURE ORDER PRESERVING STRING COMPRESSION

BACKGROUND

The present disclosure relates generally to the field of data encryption, and more specifically to order preserving encryption cumulative compression of plaintext data.

Many users are turning to database as a service (DaaS), where the users outsource database management to a third-party. Main assumption of using DaaS is that, the database provider is honest in executing the secure protocols for user's query exercising the database.

SUMMARY

Embodiments of the present disclosure include a method, computer program product, and system for generating order preserving encrypted cumulative compressed data. A processor may receive plaintext data. The plaintext data may correspond to a query. The processor may identify a granularity of the plaintext data. The processor may compress the plaintext data using a binary search tree. The binary search tree may compress the plaintext data based on the granularity of the plaintext data. The processor may encrypt the plaintext data by randomizing the order in which the binary search tree stores the compression of the plaintext data. The stored order of the binary search tree may act as a private key. The processor may process the query over an encrypted cumulative compressed database.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
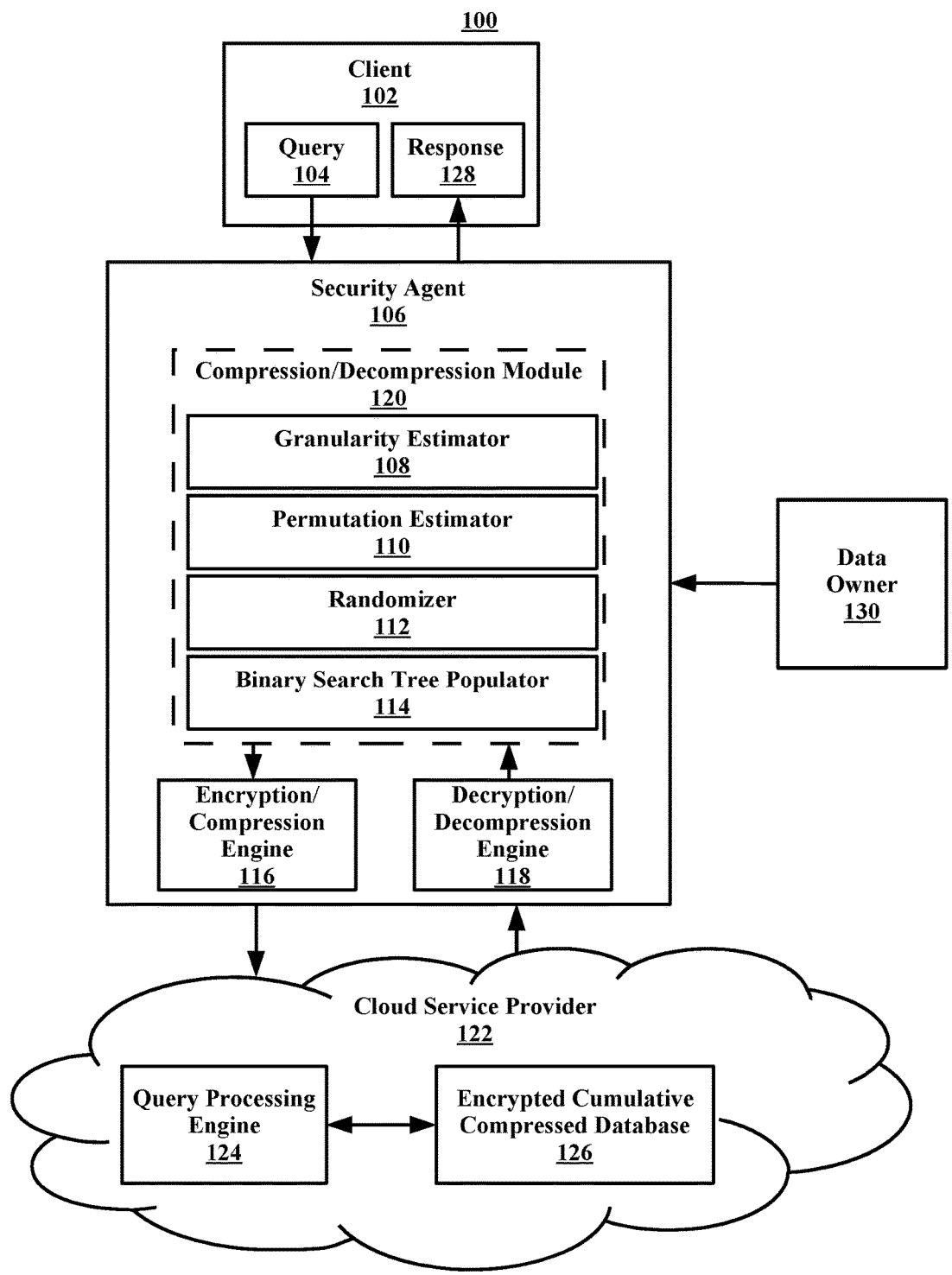
FIG. 1 depicts a block diagram of an example system processing a query using order preserving encryption and compression, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of data encryption, and more specifically to order preserving encryption cumulative compression of plaintext data. While the present disclosure is not necessarily limited to such applications, various aspects of the disclosure may be appreciated through a discussion of various examples using this context.

A user outsourcing a database may desire to both protect their outgoing data and decrease the database storage cost while maintaining the query execution response time. Typically, though, the user is likely to either encrypt their outgoing data or decrease the storage cost of their data by compressing the data. In order to achieve both data protection and storage reduction with efficient query execution, simultaneous order preserving encryption and compression of user's data may need to be performed.

In some embodiments, a processor may receive plaintext data (e.g., a query). The processor may identify a granularity of the plaintext data. The processor may compress the plaintext data (e.g., the data corresponding to the query) using a binary search tree. The binary search tree may compress the plaintext data based on the granularity of the plaintext data. The processor may encrypt the plaintext data by randomizing the order in which the binary search tree stores the compression of the plaintext data. The stored, randomized order of the binary search tree may act as a private key. The processor may process the plaintext data in an encrypted cumulative compressed database. In some embodiments, a traversal path of any node in the binary search tree may act as the private key for encryption and compression.

For example, a user outsourcing a database to a third-party may know that a competitor is also using the third-party database. The user may query for "qubit," (e.g., with "qubit" being the plaintext data of the query) which will give information on a new venture that the user is considering. In order to ensure that the competitor does not identify what the user is looking for, the user may execute the query process, through a security agent (or the query may automatically process through the security agent).

The security agent may receive the plaintext data of the query as "qubit," and identify that the granularity of "qubit" as 5 (e.g., granularity corresponding to the number of letters in the word "qubit"). The security agent may then compress and encrypt the plaintext term "qubit" using a binary search tree. The compression of the plaintext data will save computation resources and time during the processing of the query. That is because compression by the binary search tree is $\log_2(11881376)$, where 11881376 was determined from $26^5$ (the number of nodes in the binary search tree), which is the total number of letters in the alphabet raised to the granularity. The binary search tree of maximum path length $\log_2(11881376)$, which equals 23.5, indicates, to the nearest whole number rounded-up, that 24 bits are needed to store and process the compressed plaintext data of the query. Whereas, 8 bits per letter is usually what is required to store and process the plaintext data of the query, that is, "qubit" before compression would have taken 40 bits (i.e., 8*5=40) of computational space to process.

The security agent using a randomizer may then encrypt the plaintext data "qubit" of the query. The randomizer may pick in random order from a set of generated elements of the plaintext data of "qubit" and insert a traversal path associated with the random order in to the 24-bit binary search tree. The set of generated elements may consist of five elements "q," "u," "b," "i," and "t;" and the elements may be arranged in each of the 120 possible arrangements (i.e., 5!). The generated element of "bquit" may then be chosen at random from the group of 120 and a traversal path to "bquit" may be inserted in to the binary search tree. It is noted that another element from the set of generated elements may be chosen (e.g., "quitb," etc.).

The randomized binary search tree may now act as a private key that will send the encrypted query for processing over an encrypted database (e.g., which may be encrypted using the binary search tree), in order to receive a response to the query. It is noted that the steps described in the above example do not necessarily have to be performed in such an order and can be performed in any suitable order, for example, simultaneously encrypting and compressing the plaintext data.

In some embodiments, the processor may receive a response from the encrypted cumulative compressed database. The response may be encrypted and compressed. The processor may decrypt and decompress the response using the binary search tree as the private key. The processor may then display the response to a user.

Following the example above, the encrypted database may search for a response to the plaintext data of "qubit" for the query. The encrypted database and the plaintext data of the query both are encrypted using the same binary search tree as the private key and thus the encrypted database is able to provide a valid response to the query as though the query was directly sent without encryption. The encrypted database may identify a response, which is encrypted and compressed by the binary search tree as the private key (e.g., either in the same fashion that the plaintext data was compressed or originally identified in a compressed form in the encrypted database) to the plaintext data and send it to the security agent. The security agent upon receiving the response from the encrypted cumulative compressed database will decrypt and decompress the response using the binary search tree as the private key. The security agent may then forward the response to a display (e.g., of a laptop, a system used to input the query by the user, etc.) being used by the user.

In some embodiments, the encrypted cumulative compressed database may be an encrypted version of an original database. The encryption of the original database may include copying original data associated with the original database and encrypting the original data using the binary search tree as the private key. For example, upon randomizing the order of insertion of elements in the binary search tree, the binary search tree may be stored for use as a private key. An original database used to answer queries may then be copied. The copied version of the original database may be encrypted and compressed with the binary search tree as the private key. This may allow the database to process the query using the same encryption (e.g., hence order preservation). The query is encrypted and the plaintext database is encrypted with the same private key (e.g., binary search tree), which allows the database to accurately respond to the query because each are encrypted with the same private key.

In some embodiments, the copied version of the original database that is encrypted may be stored and updated each time new plaintext data is received. That is, the encrypted cumulative compressed database is generated once and may be stored as a separate database. The encrypted cumulative compressed database may then be updated by appending with the encryption of new plaintext data generated using the binary search tree as the private key. Further, any updates to the existing encrypted data may be accomplished by deleting an encrypted/compressed record of the existing encrypted data stored in the cloud database and adding a new encrypted/compressed record of the updated plaintext data in the encrypted database using the binary search tree.

In some embodiments, the binary search tree may be generated by a permutation of a numerical amount associated to a class of the plaintext data to a power corresponding to the selected granularity for the plaintext data. In some embodiments, randomizing the order in which the binary search tree stores the compression of the plaintext data may include (e.g., comprise, etc.) identifying that the granularity does not align with the length of the permutation. In some embodiments, the binary search tree is a balanced binary search tree. In some embodiments, the class of the plaintext data may be a numerical class. The numerical class may have a numerical count of 10 (i.e., 0-9).

For example, plaintext data may be "1234" and thus numerical based. A processor trying to generate a binary search tree may identify that the plaintext data is four letters in length, and the plaintext data has a granularity of four. Additionally, the processor may note that each of the four letters could have been 0-9. Thus, the processor may determine a permutation of the plaintext data is $10^4$, which equals 10,000. The processor may then take the permutation and begin generating a binary search tree. The binary search tree may consist of 10,000 nodes and the path length of the leaf nodes may be $\log_2(10,000)$, which equals 13.29 bits; meaning that the binary search tree will use 13.29 bits to compress and store the plaintext data. However, knowing the binary nature of bits, the nearest common bit scheme, rounded-up, would be 16 bits. Thus, the processor recognizes that "1234" as a binary number must be stored in 16 bits.

Before storing the plaintext data as a traversal path in the binary search tree, the processor may pick in random order from a set of generated elements, which may have been generated by the permutation. That is, the permutation may consist of four elements 1, 2, 3, and 4; and the elements may be arranged in each of the 24 possible arrangements (1234, 1243, 1324, 1342, 1423, 1432, 2134, 2143, 2314, 2341, 2413, 2431, 3124, 3142, 3214, 3241, 3412, 3421, 4123, 4132, 4213, 4231, 4312, and 4321). The generated element of "1234" may then be chosen at random from the group of 24 and inserted in to the binary search tree.

In some embodiments, the class of the plaintext data may be an alphabetical class. The alphabetical class may have a numerical amount of 26. In some embodiments, the alphabetical class may account for a space between a word (e.g., pass word), making the numerical amount 27. In some embodiments, the class of the plaintext data may be both a numerical class and an alphabetical class (e.g., "password2").

Referring now to FIG. 1, illustrated is a block diagram of an example system 100 processing a query 104 using order preserving encryption and compression, in accordance with embodiments of the present disclosure. The query 104 may correspond to (e.g., include, comprise, etc.) plaintext data. In some embodiments, the system 100 may include a client 102, a security agent 106, a cloud service provider 122, and a data owner 130. The client 102 may include the query 104 and a response 128 to the query 104 (e.g., a response from the corresponding plaintext data); the client may additionally include a display (e.g., not shown) to express the query 104 and response 128. In some embodiments, when discussing the response 128, only a portion of the response 128 may be represented (e.g., a portion of the response 128 may be compressed, encrypted, etc., whereas the entire response 128 may be what is contemplated as displayed to a user on the client 102).

The security agent 106 may include a compression/decompression module 120, an encryption/compression engine 116, and a decryption/decompression engine 118. The cloud service provider may include a query processing engine 124 and an encrypted cumulative compressed database 126. The compression/decompression module 120 may include a granularity estimator 108, a permutation estimator 110, a randomizer 112, a binary search tree populator 114 (e.g., module that populates a binary search tree). It is noted that, the data owner 130 is an entity which outsources the encrypted cumulative compressed database 126 and the client 102 is an entity who queries this outsourced encrypted cumulative compressed database 126. The data owner 130 can be a client of the system 100, but not all clients of the system 100 need be a data owner.

In some embodiments, a user using the client 102 of the system 100, may input the query 104. The query 104 may travel over a secure network to the security agent 106. The security agent 106 is a trusted entity that will protect the data associated with the query 104 before and after encryption. The security agent 106 may have the compression/decompression module 120 take the query 104. The compression/decompression module 120 may begin processing the query 104 (e.g., the query 104's corresponding plaintext data) for compression and encryption by using the granularity estimator 108. The granularity estimator 108 may determine the total number of components used in the query 104. For example, the query 104 may have the plaintext data "12345" and the granularity estimator 108 may determine the granularity to be 5, the amount of numbers in the query 104. As for another example, the query 104 may have the plaintext data "semiconductor," and the granularity estimator 108 may determine the granularity to be 13, the number of letters in the query 104.

In some embodiments, the granularity estimator 108 may not be selected every time a query is issued. The granularity estimator 108 may only select a granularity once, when the plaintext data is encrypted. The selected granularity at the time of encryption will be used as the set granularity for all subsequent queries. If a query does not match the selected granularity the query may be padded to achieve the selected granularity, as discussed below.

In some embodiments, the granularity selected by the granularity estimator 108, is initially identified at the time when the data owner 130 decides to outsource the encrypted cumulative compressed database 126 (e.g., decides to encrypt and outsource a plaintext database). The granularity, through the security agent 106, is fixed to the encrypted cumulative compressed database 126 and the plaintext data 102 is transformed using this selected granularity. For example, if the selected granularity is 3 and a client's plaintext data contains "abcdef," then the plaintext data will be broken into two parts ("abc" and "def") and each of the parts will then be searched in a binary search tree. Furthering the example, "abc" may be found at path "0001010010" and "def" may be found at path "101011101" of the binary search tree. Each of the paths may then be aligned to a word boundary, that is, 16 bit words may be formed using the ISO/IEC 9797-1 padding scheme. The aligned words will be "0001010010100000" and "1010111011000000."

In some embodiments, query 104 may not be aligned with the selected granularity. For example, an input plaintext data may be "abcde" and the selected granularity may be 3; splitting the input plaintext data into chunks of granularity 3 will result into two parts "abc" and "de." Since the selected granularity is 3, the term "de" will not be present in the binary search tree. In order to ensure that the term "de" is present in the binary search tree, padding may be used. Furthering the example, "de" may have a wildcard character (e.g., non-alphabetical character), such as "*" suffixed on to transform "de" to "de*." The new enumeration of "de" as "de*" now falls in line with the granularity 3 and may be stored in the binary search tree.

The security agent 106, after determining the granularity of the query 104, may use the permutation estimator 110 to generate a permutation that will be used to generate a binary search tree and/or associated bits/nodes of the binary search tree. The permutation estimator 110 may identify the class of the query 104 and raise a numerical amount associated with the class to a power corresponding to the selected granularity provided by the granularity estimator 120. For example, the query 104 may have the plaintext data (e.g., numbers) "123," which is associated with a numerical class. The numerical class may be associated with numerical amount of 10 (e.g., 0-9). The permutation estimator 110 will then raise the numerical amount of 10 to the power of 3, associated with the selected granularity. That is, the permutation estimator 110 will produce an outcome of 1000 (i.e., 10^3), and take the log base 2 of 1000 (i.e., $\log_2(1000)$) to generate the number of bits/nodes (e.g., each bit needing to be stored in a node) needed for the binary search tree (i.e., 9.96).

In some embodiments, the compression/decompression module 120 may identify that the bits/nodes associated with the binary search tree is not in line with standard bit schemes and increase the number of bits/nodes to the nearest standard bit scheme, rounded-up. Following the example above, 9.96 bits is too high to fit into an 8-bit scheme, so the compression/decompression module 120 will increase the binary search tree to the next standard bit scheme of 16-bits.

The compression/decompression module 120 may then initiate the randomizer 112 in conjunction with the binary search tree populator 114 to place each component of elements associated with a generated set corresponding to the query 104 into one of the nodes available to the binary search tree (e.g., generating a traversal path). In some embodiments, the randomizer 112 may randomize the order of elements in a set generated by the permutation estimator 110. In some embodiments, tags or relational look up tables may be stored in the security agent 106 in order to decipher the binary search tree.

In other embodiments, when deciphering a query in the binary search tree, the traversal path of the node(s) corresponding to the query may be extracted from the binary search tree. The traversal path may then be aligned to a word boundary with a 1 followed by remaining zeros. Following the example above, the query traversal path of "123" may be extracted from the binary search tree and be 1111011. To align the traversal path with a word boundary associated with the 16-bit scheme determined above, 1111011 may be padded with a 1, and eight subsequent zeros (i.e., 1111011100000000). It is noted that a binary representation is not needed, and that the examples presented in this disclosure are not limiting.

After the compression/decompression module 120 has generated the binary search tree, the compression/decompression module 120 may transfer the binary search tree being used as a private key to the encryption/compression engine 116. The security agent 106, using a secure network, may access the cloud service provider 122 and outsource the encrypted cumulative compressed database 126 using the encryption/compression engine 116. The encryption/compression engine 116 will encrypt the plaintext database with the binary search tree being used as the private key.

In some embodiments, after generating the binary search tree to be use as the private key, the security agent may receive stored data from the data owner 130. Some of the stored data received may be related to the query 104. The data owner 130 may send all stored information to the security agent 106 in case a user of the system 100 is able to compromise the integrity of the query processing. Thus, the binary search tree as the private key and information specific to the query 104 are not exposed to any other component in the system 100 other than the security agent 106. After receiving the stored data from the data owner 130, the security agent 106 may encrypted the stored data using the binary search tree.

The security agent may additionally send the query 104 and information specific to the query 104, which have been encrypted via the encryption/compression engine 116, to the query processing engine 124. The query processing engine 124 communicating with the encrypted cumulative compressed database 126 may then generate the response 128 to the query 104. During the query processing time when the response 128 is generated, only the encryption cumulative compressed database 126 is executed. The encryption cumulative compressed database 126 uses the binary search tree created during the encryption cumulative compression of the plaintext database. The query 104 may be processed by the query processing engine 124 using the encrypted cumulative compressed database 126 because both the query 104 and the encrypted cumulative compressed database 126 are encrypted by the same binary search tree.

In some embodiments, the response 128 may be encrypted and compressed when generated by the query processing engine 124 because the query 104 and the encrypted cumulative compressed database 126 were both encrypted (e.g., by the data owner 130) and compressed during processing of the query 104. The cloud provider 122 may transmit, over a secure network, the response 128. The response 128 may be received by the security agent 106; the security agent 106 may allow the decryption/decompression engine 118 to decrypt and decompress the response 128. The decryption/decompression engine 118 may decompress the response 128, following the same steps used for the compression process detailed above. In some embodiments, the decryption/decompression engine 118 may directly use the binary search tree to decrypt the response 128, if the binary search tree is stored. The decryption/decompression engine 118 may store a copy of the binary search tree that was used as the private key. In some embodiments, the encryption/compression engine 116 and the decryption/decompression engine 118 may be the same engine.

In some embodiments, the client 102 may store a decryption key in order to keep the connection between the security agent 106 and the client 102 protected from potential threats. After decryption and decompression of the response 128, the security agent 106 may transmit the response 128 over a secure network to the client 102 that is being used by the user. In some embodiments, the secure network can be wired or wireless including any suitable networks such as LAN, WAN, PAN, etc.

Figure 2:
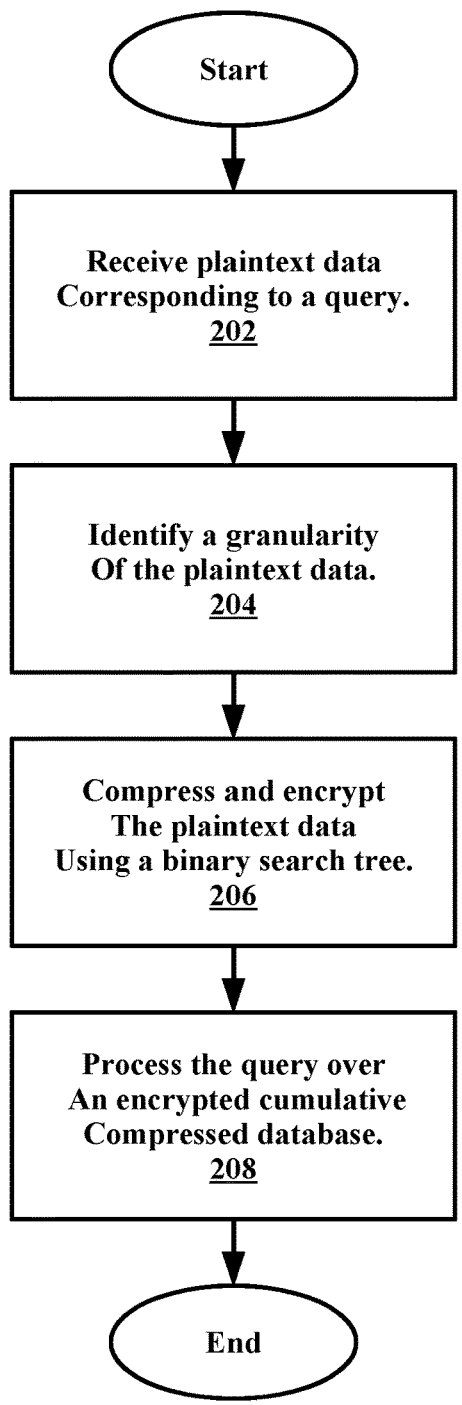
FIG. 2 illustrates a flowchart an example method for compressing and encrypting plaintext data in order to be securely processed, in accordance with embodiments of the present disclosure.

Referring now to FIG. 2, illustrated is a flowchart an example method 200 for compressing and encrypting plaintext data in order to be securely processed, in accordance with embodiments of the present disclosure. In some embodiments, the method 200 may begin at operation 202. At operation 202, a processor may receive, from a user, plaintext data that corresponds to a query. The method 200 proceeding to operation 204 may identify a granularity of the plaintext data. In some embodiments, the granularity of the plaintext data may be the total number of (individual) component parts of the plaintext data (e.g., including spaces).

The method 200 may proceed to operation 206, where the processor may compress and encrypt the plaintext data using a binary search tree. The binary search tree may be based on the granularity (e.g., length) of the plaintext data. The processor may additionally encrypt the plaintext data by randomizing the order that the binary search tree stores the compressed plaintext data. The method 200 may then proceed to operation 208, where the processor may process the query over an encrypted cumulative compressed database. In some embodiments, the binary search tree may be stored by the processor as a private key and used to encrypt the cumulative compressed database. In some embodiments, after operation 208, the method 200 may end. It is noted that the steps performed in the method 200 do not necessarily have to be performed in the order described and can be performed in any suitable order.

Figure 3:
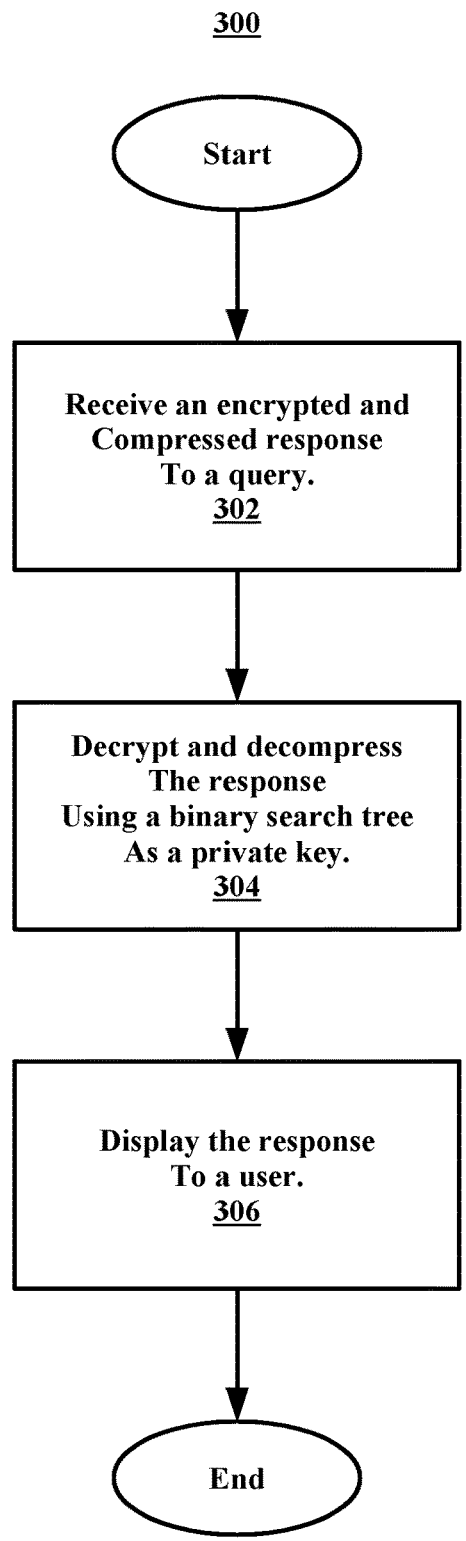
FIG. 3 illustrates a flowchart of an example method for processing an encrypted response to a query, in accordance with embodiments of the present disclosure.

Referring now to FIG. 3, illustrated is a flowchart of an example method 300 for processing an encrypted response to a query. In some embodiments, the method 300 may be a continuation of the method 200 as depicted in FIG. 2. The method 300 may being at operation 302, where a processor may receive an encrypted and compressed response to a query. In some embodiments, the processor and plaintext data discussed in FIG. 2 may be the same processor and plaintext data discussed in relation to FIG. 3.

After operation 302, the method 300 may proceed to operation 304, where the processor may decrypt and decompress the response using a binary search tree as a private key. In some embodiments, the binary search tree may be the same binary search tree as discussed in FIG. 2. After operation 304, the method 300 may proceed to operation 306, where the processor may display the decrypted and decompressed response to a user. After operation 306, the method 300 may end. It is noted that the steps performed in the method 300 do not necessarily have to be performed in the order described and can be performed in any suitable order.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third-party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third-party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
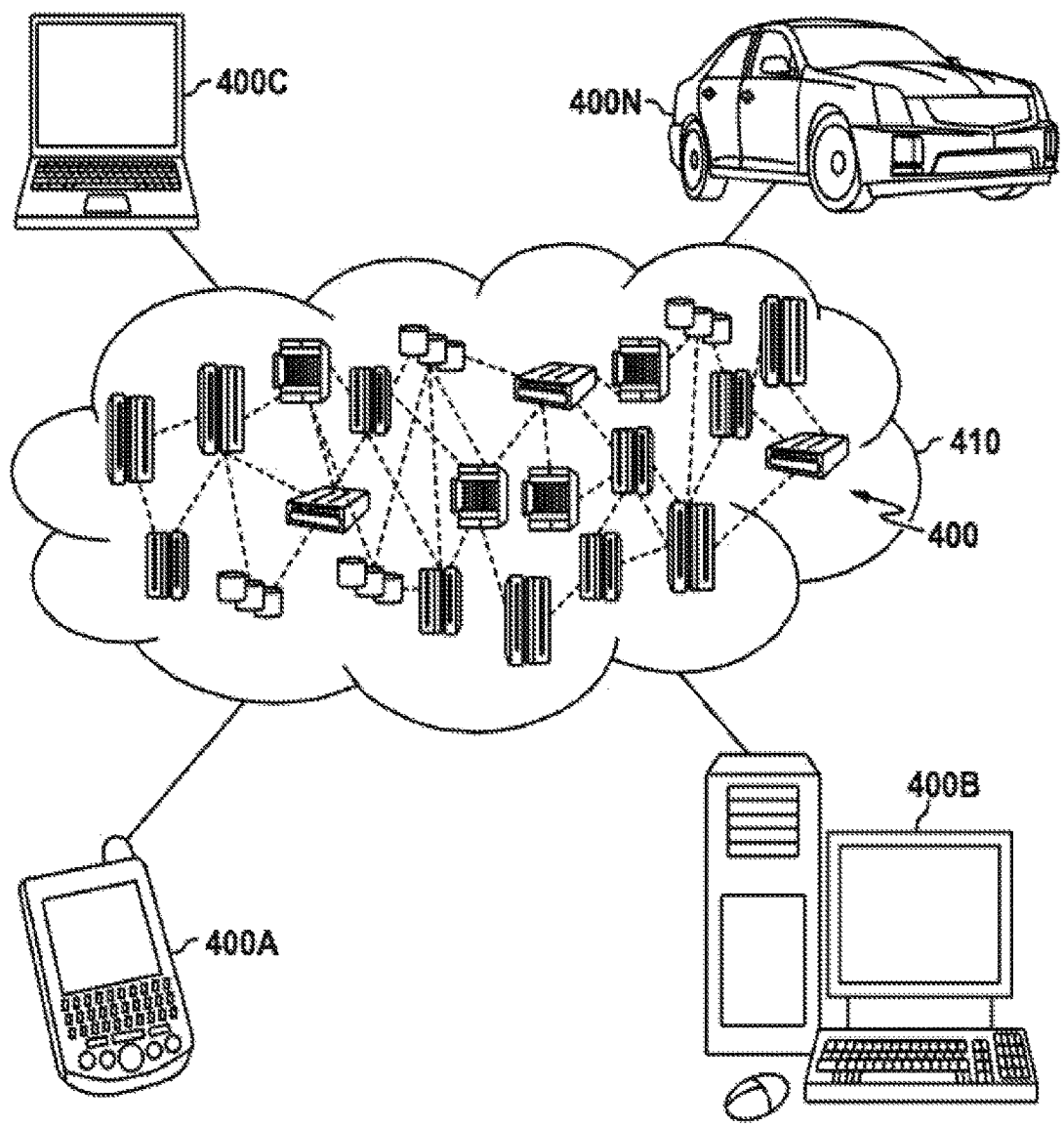
FIG. 4 depicts a cloud computing environment, in accordance with embodiments of the present disclosure.

Referring now to FIG. 4, illustrative cloud computing environment 410 is depicted. As shown, cloud computing environment 410 includes one or more cloud computing nodes 400 with which local computing devices used by cloud consumers, such as, for example, personal digital assistant (PDA) or cellular telephone 400A, desktop computer 400B, laptop computer 400C, and/or automobile computer system 400N may communicate. Nodes 400 may communicate with one another. They may be grouped (not shown) physically or virtually, in one or more networks, such as Private, Community, Public, or Hybrid clouds as described hereinabove, or a combination thereof. This allows cloud computing environment 410 to offer infrastructure, platforms and/or software as services for which a cloud consumer does not need to maintain resources on a local computing device. It is understood that the types of computing devices 400A-N shown in FIG. 4 are intended to be illustrative only and that computing nodes 400 and cloud computing environment 410 can communicate with any type of computerized device over any type of network and/or network addressable connection (e.g., using a web browser).

Figure 5:
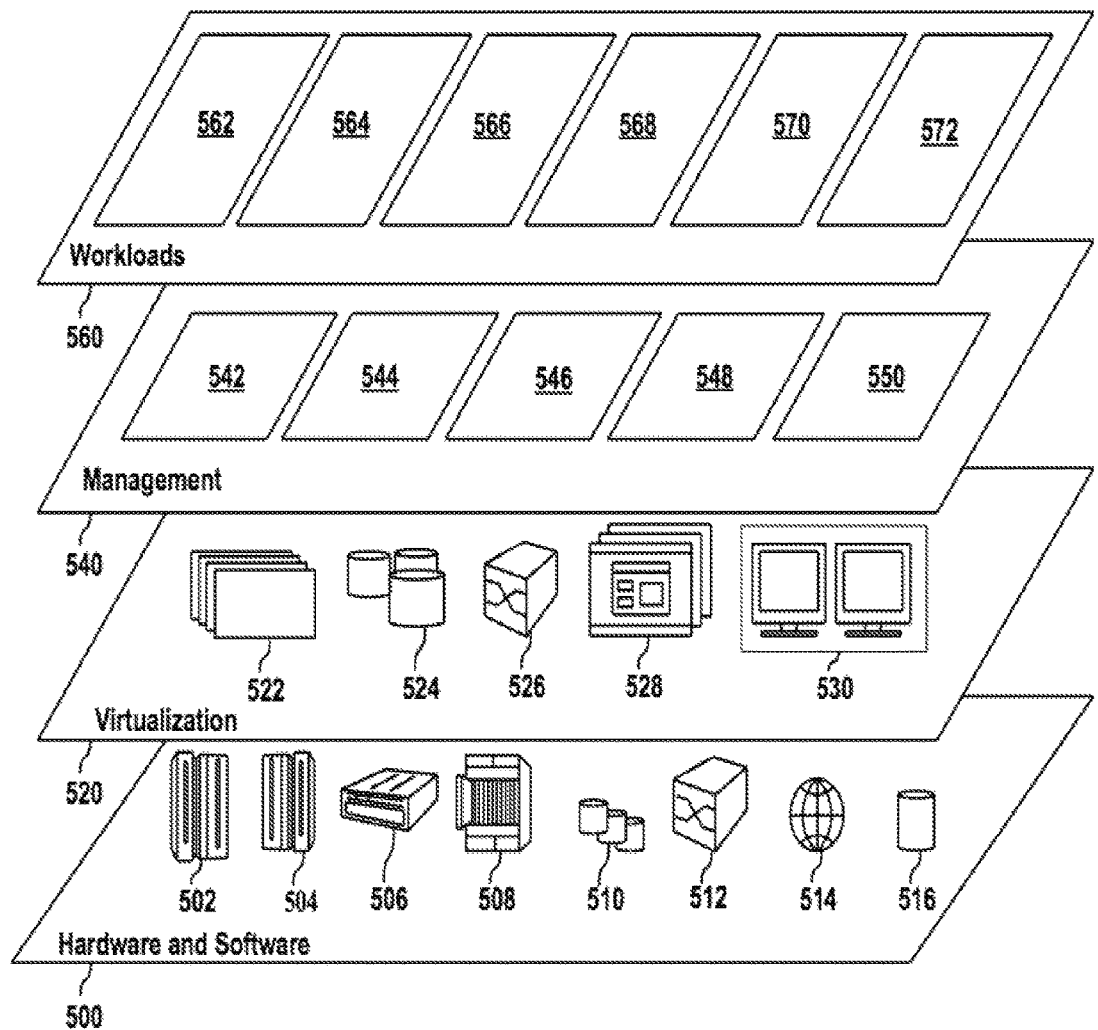
FIG. 5 depicts abstraction model layers, in accordance with embodiments of the present disclosure.

Referring now to FIG. 5, a set of functional abstraction layers provided by cloud computing environment 410 (FIG. 4) is shown. It should be understood in advance that the components, layers, and functions shown in FIG. 5 are intended to be illustrative only and embodiments of the invention are not limited thereto. As depicted below, the following layers and corresponding functions are provided.

Hardware and software layer 500 includes hardware and software components. Examples of hardware components include: mainframes 502; RISC (Reduced Instruction Set Computer) architecture based servers 504; servers 506; blade servers 508; storage devices 510; and networks and networking components 512. In some embodiments, software components include network application server software 514 and database software 516.

Virtualization layer 520 provides an abstraction layer from which the following examples of virtual entities may be provided: virtual servers 522; virtual storage 524; virtual networks 526, including virtual private networks; virtual applications and operating systems 528; and virtual clients 530.

In one example, management layer 540 may provide the functions described below. Resource provisioning 542 provides dynamic procurement of computing resources and other resources that are utilized to perform tasks within the cloud computing environment. Metering and Pricing 544 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 546 provides access to the cloud computing environment for consumers and system administrators. Service level management 548 provides cloud computing resource allocation and management such that required service levels are met. Service Level Agreement (SLA) planning and fulfillment 550 provide pre-arrangement for, and procurement of, cloud computing resources for which a future requirement is anticipated in accordance with an SLA.

Workloads layer 560 provides examples of functionality for which the cloud computing environment may be utilized. Examples of workloads and functions which may be provided from this layer include: mapping and navigation 562; software development and lifecycle management 564; virtual classroom education delivery 566; data analytics processing 568; transaction processing 570; and identifying an identifiable media 572.

Figure 6:
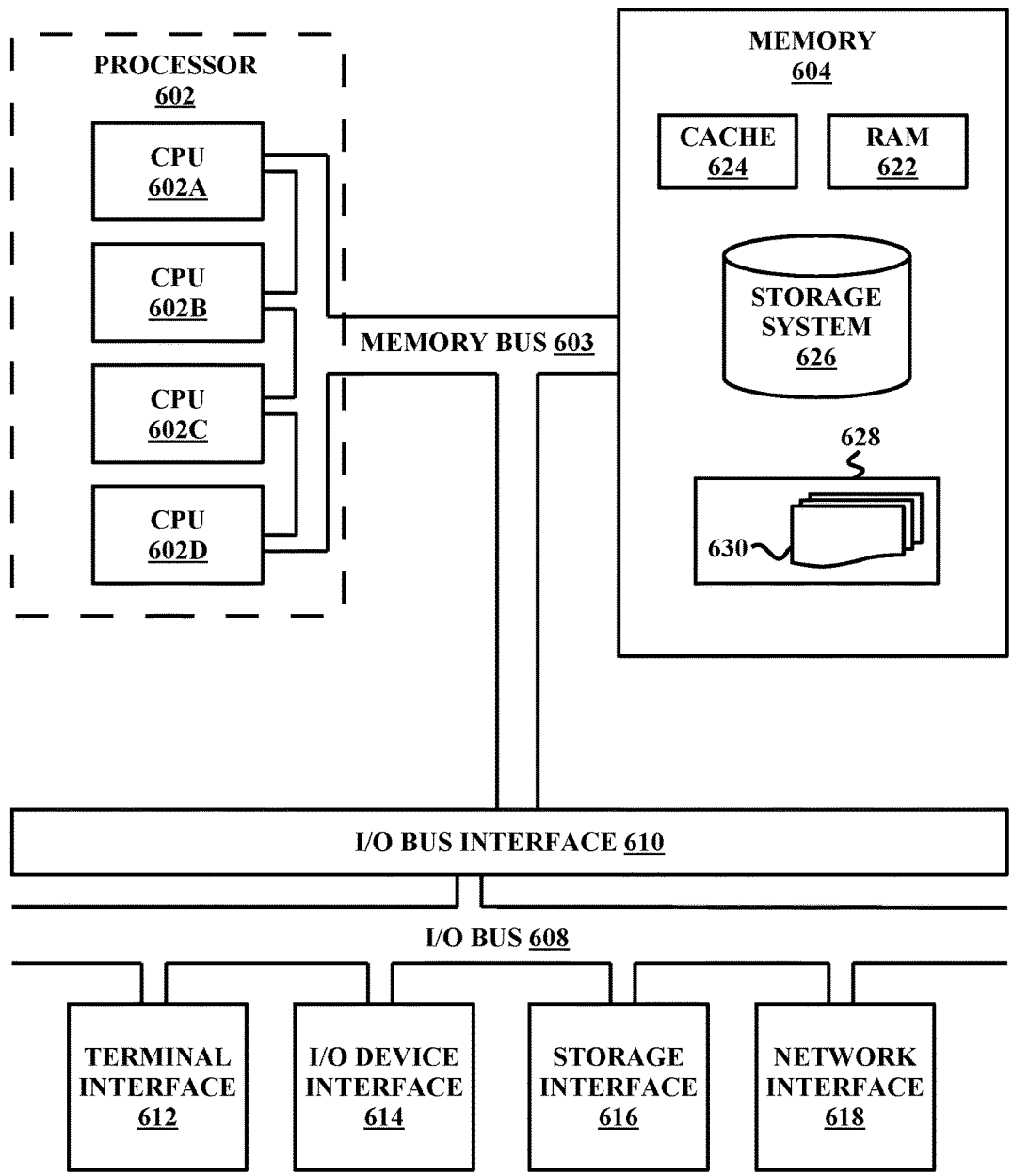
FIG. 6 illustrates a high-level block diagram of an example computer system that may be used in implementing one or more of the methods, tools, and modules, and any related functions, described herein, in accordance with embodiments of the present disclosure.

Referring now to FIG. 6, shown is a high-level block diagram of an example computer system 601 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 601 may comprise one or more CPUs 602, a memory subsystem 604, a terminal interface 612, a storage interface 616, an I/O (Input/Output) device interface 614, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may include one or more levels of on-board cache.

System memory 604 may include computer system readable media in the form of volatile memory, such as random access memory (RAM) 622 or cache memory 624. Computer system 601 may further include other removable/non-removable, volatile/non-volatile computer system storage media. By way of example only, storage system 626 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

One or more programs/utilities 628, each having at least one set of program modules 630 may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 628 and/or program modules 630 generally perform the functions or methodologies of various embodiments.

Although the memory bus 603 is shown in FIG. 6 as a single bus structure providing a direct communication path among the CPUs 602, the memory subsystem 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method comprising:
   receiving, by a processor, a plaintext data, wherein the plaintext data corresponds to a query;
   identifying a granularity of the plaintext data;
   compressing the plaintext data using a binary search tree, wherein the binary search tree compresses the plaintext data based on the granularity of the plaintext data;
   encrypting the plaintext data by randomizing the order in which the binary search tree stores the compression of the plaintext data, wherein the stored, randomized order of the binary search tree acts as a private key; and processing the query over an encrypted cumulative compressed database.

2. The method of claim 1, further comprising:

receiving, from the encrypted cumulative compressed database, a response to the plaintext data, wherein the response is encrypted and compressed;

decrypting the response using the binary search tree as the private key;

decompressing the response; and displaying the response to a user.

3. The method of claim 1, wherein the encrypted cumulative compressed database is an encrypted version of an original database, wherein encrypting the original database includes copying original data associated with the original database and encrypting the original data using the binary search tree as the private key.

4. The method of claim 1, wherein the binary search tree is generated by a permutation of a numerical amount associated to a class of the plaintext data to a power corresponding to the granularity of the plaintext data.

5. The method of claim 4, wherein randomizing the order in which the binary search tree stores the compression of the plaintext data further comprises:

identifying that the granularity does not align with the length of the permutation; and adding one or more values to the end of the plaintext data.

6. The method of claim 5, wherein the class of the plaintext data is a numerical class, the numerical class having a numerical amount of 10.

7. The method of claim 5, the class of the plaintext data is an alphabetical class, the alphabetical class having a numerical amount of 26.

8. A system comprising:

a memory; and a processor in communication with the memory, the processor being configured to perform operations comprising:

receiving, by a processor, a plaintext data, wherein the plaintext data corresponds to a query;

identifying a granularity of the plaintext data;

compressing the plaintext data using a binary search tree, wherein the binary search tree compresses the plaintext data based on the granularity of the plaintext data;

encrypting the plaintext data by randomizing the order in which the binary search tree stores the compression of the plaintext data, wherein the stored, randomized order of the binary search tree acts as a private key; and processing the query over an encrypted cumulative compressed database.

9. The system of claim 8, further comprising:

receiving, from the encrypted cumulative compressed database, a response to the plaintext data, wherein the response is encrypted and compressed;

decrypting the response using the binary search tree as the private key;

decompressing the response; and displaying the response to a user.

10. The system of claim 8, wherein the encrypted cumulative compressed database is an encrypted version of an original database, wherein encrypting the original database includes copying original data associated with the original database and encrypting the original data using the binary search tree as the private key.

11. The system of claim 8, wherein the binary search tree is generated by a permutation of a numerical amount associated to a class of the plaintext data to a power corresponding to the granularity of the plaintext data.

12. The system of claim 11, wherein randomizing the order in which the binary search tree stores the compression of the plaintext data further comprises:

identifying that the granularity does not align with the length of the permutation; and adding one or more values to the end of the plaintext data.

13. The system of claim 12, wherein the class of the plaintext data is a numerical class, the numerical class having a numerical amount of 10.

14. The system of claim 12, the class of the plaintext data is an alphabetical class, the alphabetical class having a numerical amount of 26.

15. A computer program product comprising a non-transitory computer readable storage medium having program instructions embodied therewith, the program instructions executable by a processor to cause the processor to perform a method, the method comprising:

receiving, by a processor, a plaintext data, wherein the plaintext data corresponds to a query;

identifying a granularity of the plaintext data;

compressing the plaintext data using a binary search tree, wherein the binary search tree compresses the plaintext data based on the granularity of the plaintext data;

encrypting the plaintext data by randomizing the order in which the binary search tree stores the compression of the plaintext data, wherein the stored, randomized order of the binary search tree acts as a private key; and processing the query over an encrypted cumulative compressed database.

16. The computer program product of claim 15, further comprising:

receiving, from the encrypted cumulative compressed database, a response to the plaintext data, wherein the response is encrypted and compressed;

decrypting the response using the binary search tree as the private key;

decompressing the response; and displaying the response to a user.

17. The computer program product of claim 15, wherein the encrypted cumulative compressed database is an encrypted version of an original database, wherein encrypting the original database includes copying original data associated with the original database and encrypting the original data using the binary search tree as the private key.

18. The computer program product of claim 15, wherein the binary search tree is generated by a permutation of a numerical amount associated to a class of the plaintext data to a power corresponding to the granularity of the plaintext data.

19. The computer program product of claim 18, wherein randomizing the order in which the binary search tree stores the compression of the plaintext data further comprises:

identifying that the granularity does not align with the length of the permutation; and adding one or more values to the end of the plaintext data.

20. The computer program product of claim 19, wherein the class of the plaintext data is a numerical class, the numerical class having a numerical amount of 10.

* * * * *